(12) United States Patent
Su et al.

(10) Patent No.: US 8,467,081 B2
(45) Date of Patent: Jun. 18, 2013

(54) SYSTEM AND METHOD FOR COORDINATED DOCUMENT PROCESSING AMONG DEVICES HAVING DIFFERING FUNCTIONALITY

(75) Inventors: William Su, Riverside, CA (US); Giri Natarajan, La Palma, CA (US); Jianxin Wang, Trabuco Canyon, CA (US); Hongfeng Wei, Cerritos, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1003 days.

(21) Appl. No.: 12/504,008

(22) Filed: Jul. 16, 2009

(65) Prior Publication Data

US 2011/0013218 A1 Jan. 20, 2011

(51) Int. Cl.
*G06F 3/12* (2006.01)
*G06F 15/00* (2006.01)
*H04N 1/00* (2006.01)
*H04N 1/46* (2006.01)
*G06K 15/00* (2006.01)

(52) U.S. Cl.
USPC ........... 358/1.15; 358/1.9; 358/408; 358/505; 358/2.1; 399/8; 347/3

(58) Field of Classification Search
None
See application file for complete search history.

(56) References Cited

U.S. PATENT DOCUMENTS

2004/0096234 A1* 5/2004 Kurahashi et al. .............. 399/82
2005/0099438 A1* 5/2005 Lester et al. ...................... 347/4

\* cited by examiner

*Primary Examiner* — Thomas Lett
(74) *Attorney, Agent, or Firm* — SoCal IP Law Group LLP; Steven C. Sereboff; Jonathan Pearce

(57) ABSTRACT

The subject application is directed to coordinating document processing operations among devices having differing functionality. A document is received into a first document processing device that has a first set of processing functions. A display is generated on the first device that includes indicia of an available document processing operation having a function of a first set and a secondary function of a second device, with any secondary function outside the first set. Selection data is received of an operation having functions from the first set and one or more secondary functions. Operation of the first device is controlled by a controller operable to control the functions of the first set by the first device on the document. The document is communicated to the second device following completion of any first set functions. The document processing operation is completed by the second device via completion of any secondary functions.

17 Claims, 9 Drawing Sheets

120
SYSTEM AND METHOD FOR COORDINATED DOCUMENT PROCESSING AMONG DEVICES HAVING DIFFERING FUNCTIONALITY

BACKGROUND OF THE INVENTION

The subject application is directed generally to document processing operations. The application is particularly applicable to document processing operations that include functionality derived from complementary abilities of multiple, networked devices.

Document processing devices include printers, scanners, copiers, facsimile devices, and the like. Modern day document processing devices are often built as complex, multifunction peripherals (MFPs) or multifunction devices (MFDs), which include two or more document processing functions. Various devices may also include functions such as finishing options or media options. By way of example, some devices may include staplers, hole-punchers or collators. Some devices may have different media trays stocking different paper sizes. Other devices may have color printing capability while others are relegated to black-and-white output. A typical office environment will have document processing devices with multiple variations of functions or capabilities. A user must determine which device has the capability to perform a desired document processing operation, locate that device, and commence a job when it becomes available. However, certain desired document processing operations may require several functions which no device available to a user is capable of performing by itself.

SUMMARY OF THE INVENTION

In accordance with one embodiment of the subject application, there is provided a system and method for coordinated document processing operations among devices having differing functionality. A document is first received into a first document processing device that has a first set of document processing functions. On a user interface of the first document processing device, a display is generated that includes indicia corresponding to at least one available document processing operation inclusive of at least one document processing function of a first set of such functions and at least one secondary function of a second document processing device, with any secondary function being outside the first set of functions. The first document processing device and the second document processing device are in network data communication. Document processing selection data is then received via the user interface corresponding to a user selected document processing operation for the document, which operation includes one or more document processing functions from the first set of functions and one or more secondary functions. Operation of the first document processing device is then controlled in accordance with an associated controller, which includes a processor and associated data storage, and which is operable to control the operations of the first set of document processing functions such that the first document processing device performs the at least document processing function from the first set of functions on the document. The document is then communicated to the second document processing device following completion of one or more functions from the first set by the first document processing device. The document is processed to complete the document processing operation in accordance with the document processing selection data via completion of the one or more secondary document processing functions on the document by the second document processing device.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for document processing operations. In particular, the subject application is directed to a system and method for document processing operations that include functionality derived from complementary abilities of multiple, networked devices. More particularly, the subject application is directed to a system and method that is applicable to coordinated document processing operations among devices having differing functionality. It will become apparent to those skilled in the art that the system and method described herein are suitably adapted to a plurality of varying electronic fields employing automated configuration, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
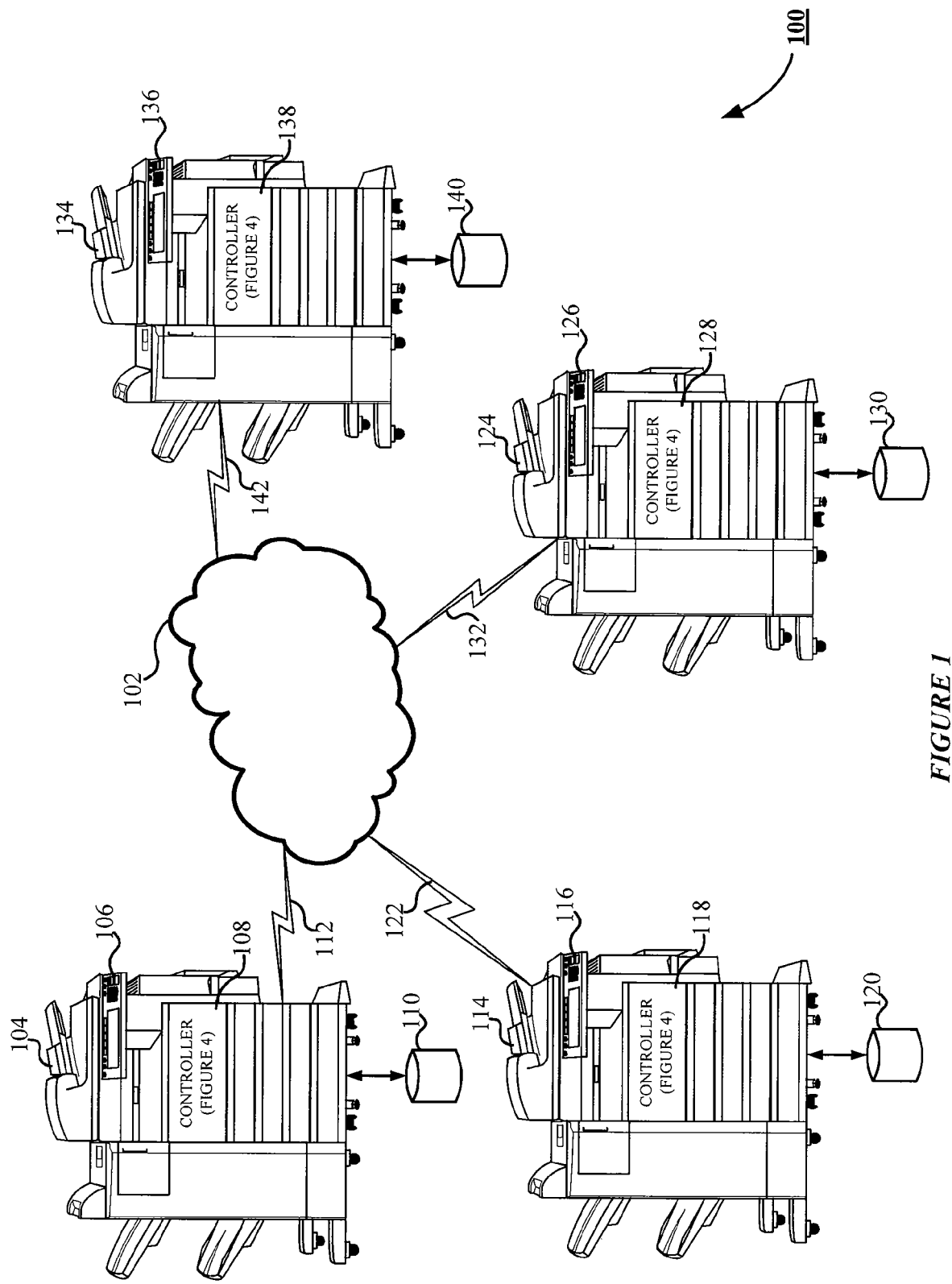
FIG. 1 is an overall diagram of a system for coordinated document processing operations among devices having differing functionality according to one embodiment of the subject application.

Referring now to FIG. 1, there is shown an overall diagram of a system 100 for coordinated document processing operations among devices having differing functionality in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also one or more document processing devices, depicted in FIG. 1 as the document processing devices 104, 114, 124, and 134. As shown in FIG. 1, the document processing devices 104, 114, 124, and 134 are illustrated as multifunction peripheral devices, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing devices 104, 114, 124, and 134 are suitably adapted to provide remote document rendering services to external or network devices. According to one embodiment of the subject application, the document processing devices 104, 114, 124, and 134 include hardware, software, and any suitable combination thereof, configured to interact with an associated user, a networked device, or the like. Preferably, the document processing devices 104, 114, 124, and 134 are capable of communicating electronic documents to and from each other in accordance with user provided instructions, transferring electronic documents amongst each other based upon output capabilities, locations, or the like.

According to one embodiment of the subject application, the document processing devices 104, 114, 124, and 134 are suitably equipped to receive a plurality of portable storage media, including, without limitation, Firewire drive, USB drive, SD, MMC, XD, Compact Flash, Memory Stick, and the like. In the preferred embodiment of the subject application, the document processing devices 104, 114, 124, and 134 further include associated user interfaces 106, 116, 126, and 136 such as a touch-screen, LCD display, touch-panel, alphanumeric keypad, or the like, via which an associated user is able to interact directly with the document processing devices 104, 114, 124, and 134. In accordance with the preferred embodiment of the subject application, the user interfaces 106, 116, 126, and 136 are advantageously used to communicate information to associated users and receive selections from such associated users.

The skilled artisan will appreciate that the user interfaces 106, 116, 126, and 136 comprise various components, suitably adapted to present data to associated users, as are known in the art. In accordance with one embodiment of the subject application, the user interfaces 106, 116, 126, and 136 comprise a display, suitably adapted to display one or more graphical elements, text data, images, or the like, to an associated user, receive input from the associated user, and communicate the same to a backend component, such as controllers 108, 118, 128, and 138, as explained in greater detail below. Preferably, the document processing devices 104, 114, 124, and 134 are communicatively coupled to the computer network 102 via suitable communications links 112, 122, 132, and 142. As will be understood by those skilled in the art, suitable communications links include, for example and without limitation, WiMax, 802.11a, 802.11b, 802.11g, 802.11 (x), Bluetooth, the public switched telephone network, a proprietary communications network, infrared, optical, or any other suitable wired or wireless data transmission communications known in the art. The functioning of the document processing devices 104, 114, 124, and 134 will be better understood in conjunction with the block diagrams illustrated in FIGS. 2 and 3, explained in greater detail below.

In accordance with one embodiment of the subject application, the document processing devices 104, 114, 124, and 134 further incorporate a backend component, designated as the controllers 108, 118, 128, and 138, suitably adapted to facilitate the operations of their respective document processing devices 104, 114, 124, and 134, as will be understood by those skilled in the art. Preferably, the controllers 108, 118, 128, and 138 are embodied as hardware, software, or any suitable combination thereof, configured to control the operations of the associated document processing devices 104, 114, 124, and 134, facilitate the display of images via the user interfaces 106, 116, 126, and 136, direct the manipulation of electronic image data, maintain the security of applications, user information, data, and the like. For purposes of explanation, the controllers 108, 118, 128, and 138 are used to refer to any myriad of components associated with the document processing devices 104, 114, 124, and 134, including hardware, software, or combinations thereof, functioning to perform, cause to be performed, control, or otherwise direct the methodologies described hereinafter. It will be understood by those skilled in the art that the methodologies described with respect to the controllers 108, 118, 128, and 138 are capable of being performed by any general purpose computing system, known in the art, and thus the controllers 108, 118, 128, and 138 are representative of such a general computing device and is intended as such when used hereinafter. Furthermore, the use of the controllers 108, 118, 128, and 138 hereinafter is for the example embodiment only, and other embodiments, which will be apparent to one skilled in the art, are capable of employing the system and method for coordinated document processing operations among devices having differing functionality of the subject application. The functioning of the controllers 108, 118, 128, and 138 will better be understood in conjunction with the block diagrams illustrated in FIGS. 4 and 5, explained in greater detail below.

Communicatively coupled to the document processing devices 104, 114, 124, and 134 are data storage devices 110, 120, 130, and 140. In accordance with the preferred embodiment of the subject application, the data storage devices 110, 120, 130, and 140 are any mass storage device known in the art including, for example and without limitation, magnetic storage drives, a hard disk drive, optical storage devices, flash memory devices, or any suitable combination thereof. In the preferred embodiment, the data storage devices 110, 120, 130, and 140 are suitably adapted to store security levels, security software, document data, image data, electronic database data, or the like. It will be appreciated by those skilled in the art that while illustrated in FIG. 1 as being a separate component of the system 100, the data storage devices 110, 120, 130, and 140 are capable of being implemented as internal storage components of the document processing devices 104, 114, 124, and 134 components of the controllers 108, 118, 128, and 138, or the like, such as, for example and without limitation, an internal hard disk drive, or the like.

Figure 2:
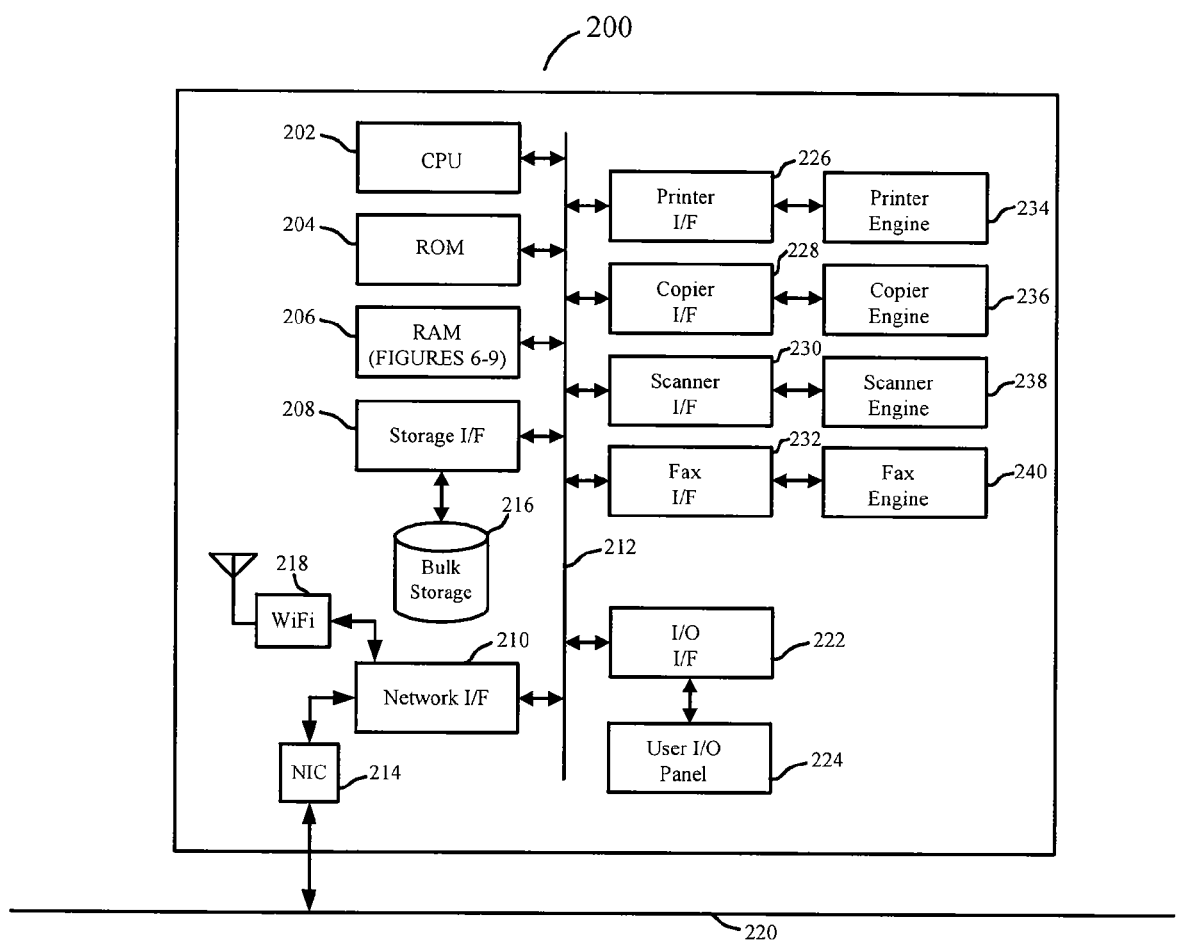
FIG. 2 is a block diagram illustrating device hardware for use in the system for coordinated document processing operations among devices having differing functionality according to one embodiment of the subject application.

Turning now to FIG. 2, illustrated is a representative architecture of a suitable device 200, shown in FIG. 1 as the document processing devices 104, 114, 124, and 134, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
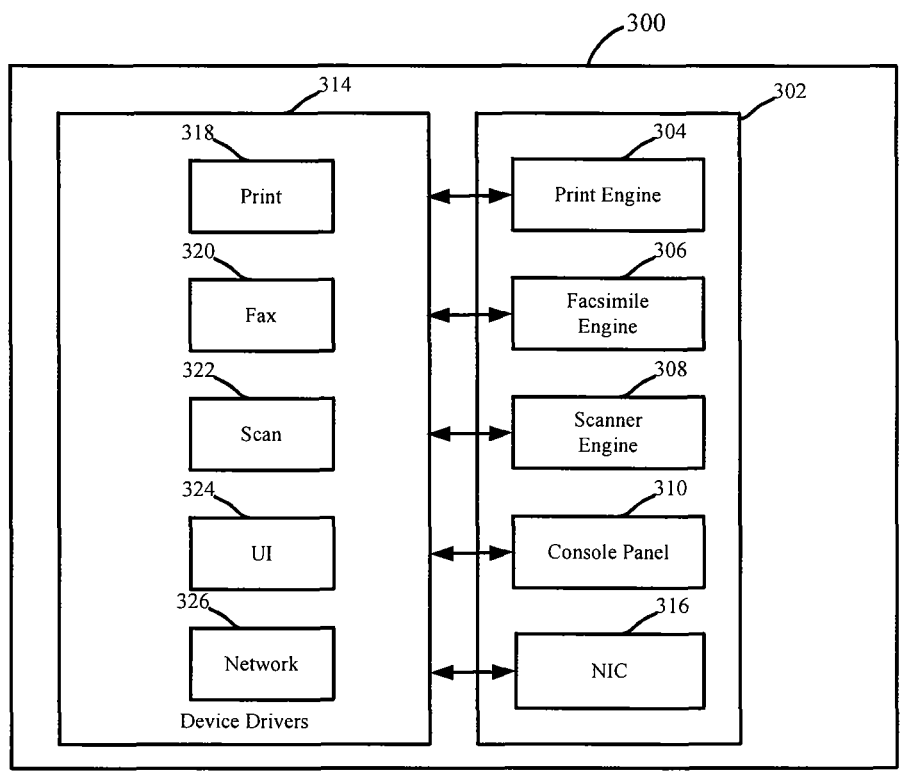
FIG. 3 is a functional diagram illustrating the device for use in the system for coordinated document processing operations among devices having differing functionality according to one embodiment of the subject application.

Turning now to FIG. 3, illustrated is a suitable document processing device, depicted in FIG. 1 as the document processing devices 104, 114, 124, and 134, for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
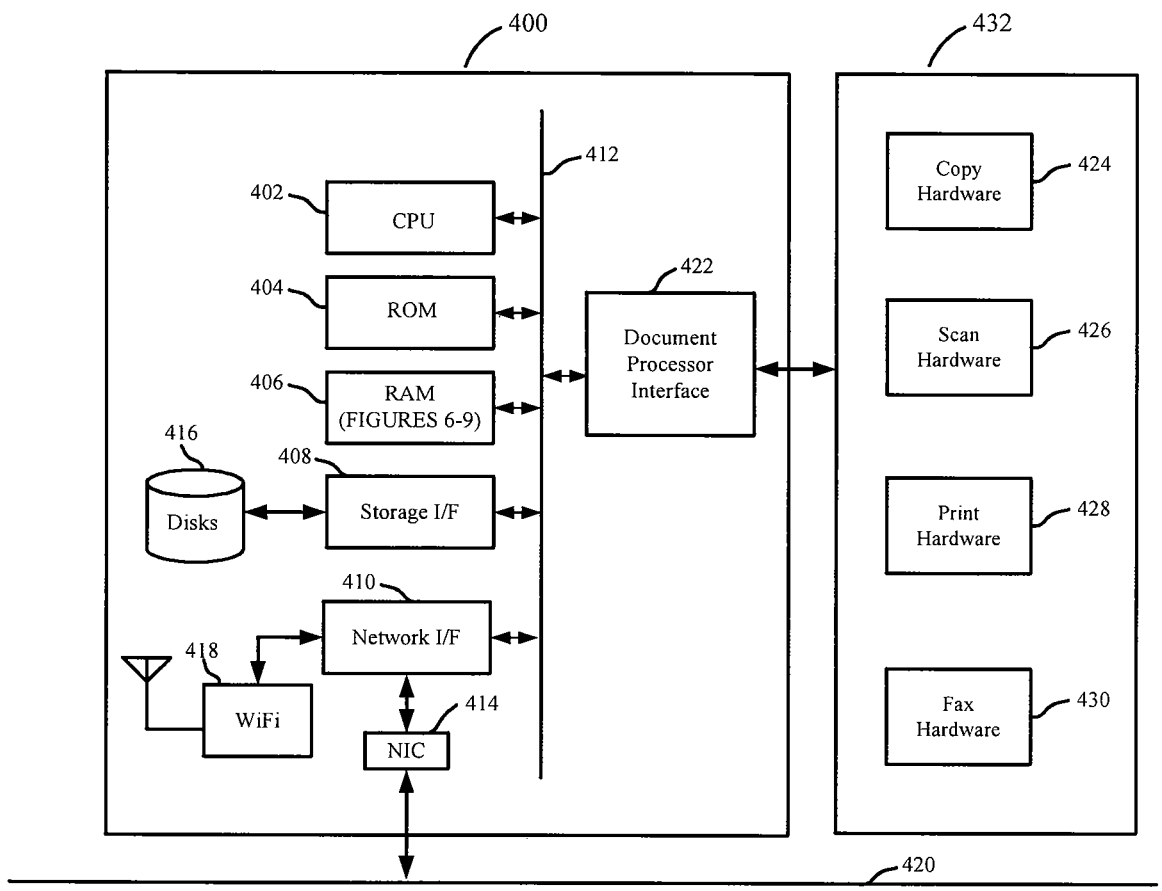
FIG. 4 is a block diagram illustrating controller hardware for use in the system for coordinated document processing operations among devices having differing functionality according to one embodiment of the subject application.

Turning now to FIG. 4, illustrated is a representative architecture of a suitable backend component, i.e., the controller 400, shown in FIG. 1 as the controllers 108, 118, 128, and 138, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
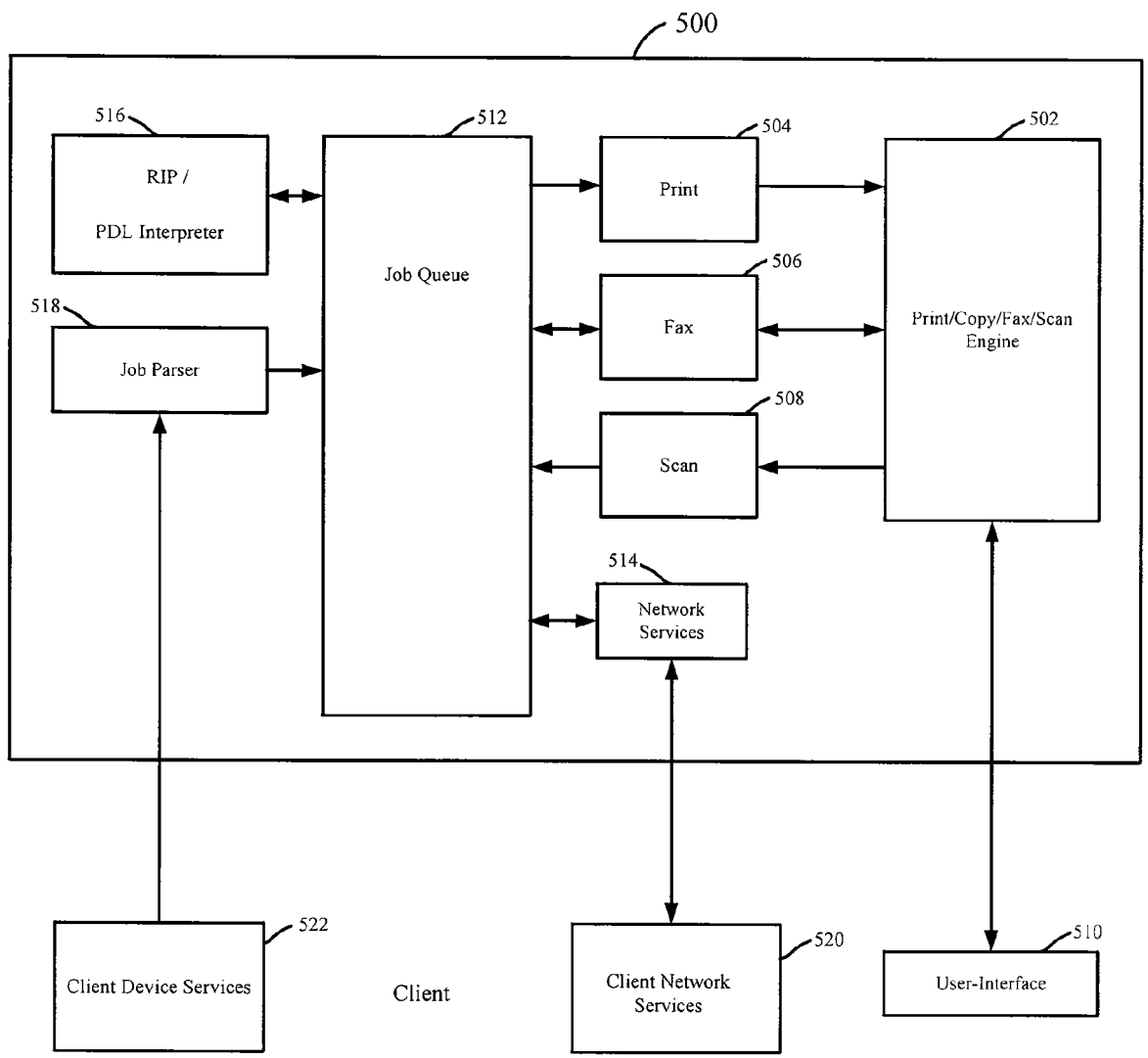
FIG. 5 is a functional diagram illustrating the controller for use in the system for coordinated document processing operations among devices having differing functionality according to one embodiment of the subject application.

Functionality of the subject system 100 is accomplished on a suitable document processing device, such as the document processing devices 104, 114, 124, and 134, which includes the controller 400 of FIG. 4, (shown in FIG. 1 as the controllers 108, 118, 128, and 138) as an intelligent subsystem associated with a document processing device. In the illustration of FIG. 5, controller function 500 in the preferred embodiment, includes a document processing engine 502. A suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
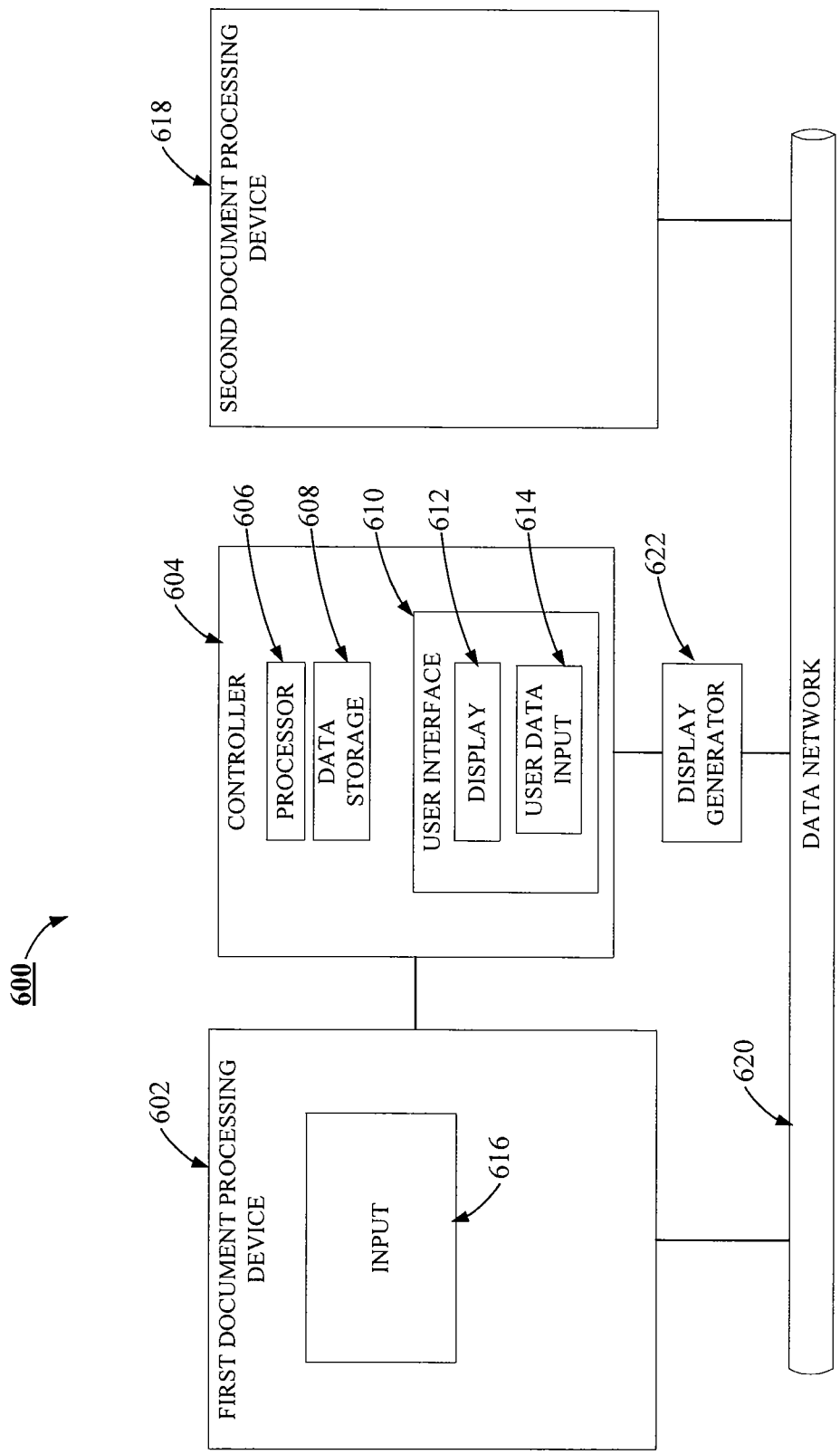
FIG. 6 is a block diagram illustrating the system for coordinated document processing operations among devices having differing functionality according to one embodiment of the subject application.

Referring now to FIG. 6, illustrated is a block diagram of a system 600 for coordinated document processing operations among devices having differing functionality in accordance with one embodiment of the subject application. As shown in FIG. 6, the system 600 includes a first document processing device 602 having a first set of document processing functions. The system 600 further includes a controller 604, that incorporates a processor 606 and an associated data storage 608. According to one embodiment of the subject application, the controller 604 is operable to control operation of the first set of document processing functions. The system 600 further includes a user interface 610 to the controller 604, the user interface 610 including a display 612 and a user data input 614. The first document processing device 602 is further equipped with an input 616 operable to receive a document into the first document processing device 602.

The system 600 also contains a second document processing device 618 that has a second set of document processing functions including at least one secondary function outside of the first set of document processing functions. Preferably, the first document processing device 602 is in data communication with the second document processing device 618 via an associated data network 620. Associated with the controller 604 is a display generator 622, which is operable to generate document processing selection data on the display 612, the document processing selection data including a document processing operation for the document, which document processing operation includes the at least one document processing function from the first set thereof and the at least one secondary function.

In accordance with one embodiment of the subject application, the user data input 614 is configured to receive user selection input data that corresponds to at least one user-selected document processing operation. Preferably, the user-selected document processing operation utilizes the document processing function from the first set of functions and the secondary document processing function. According to one embodiment of the subject application, the controller 604 is configured to perform the document processing function on the document and to afterwards communicate the document to the second document processing device 618 for completion of the secondary document processing function such that the document is processed to complete the document processing operation in accordance with the document processing selection data.

Figure 7:
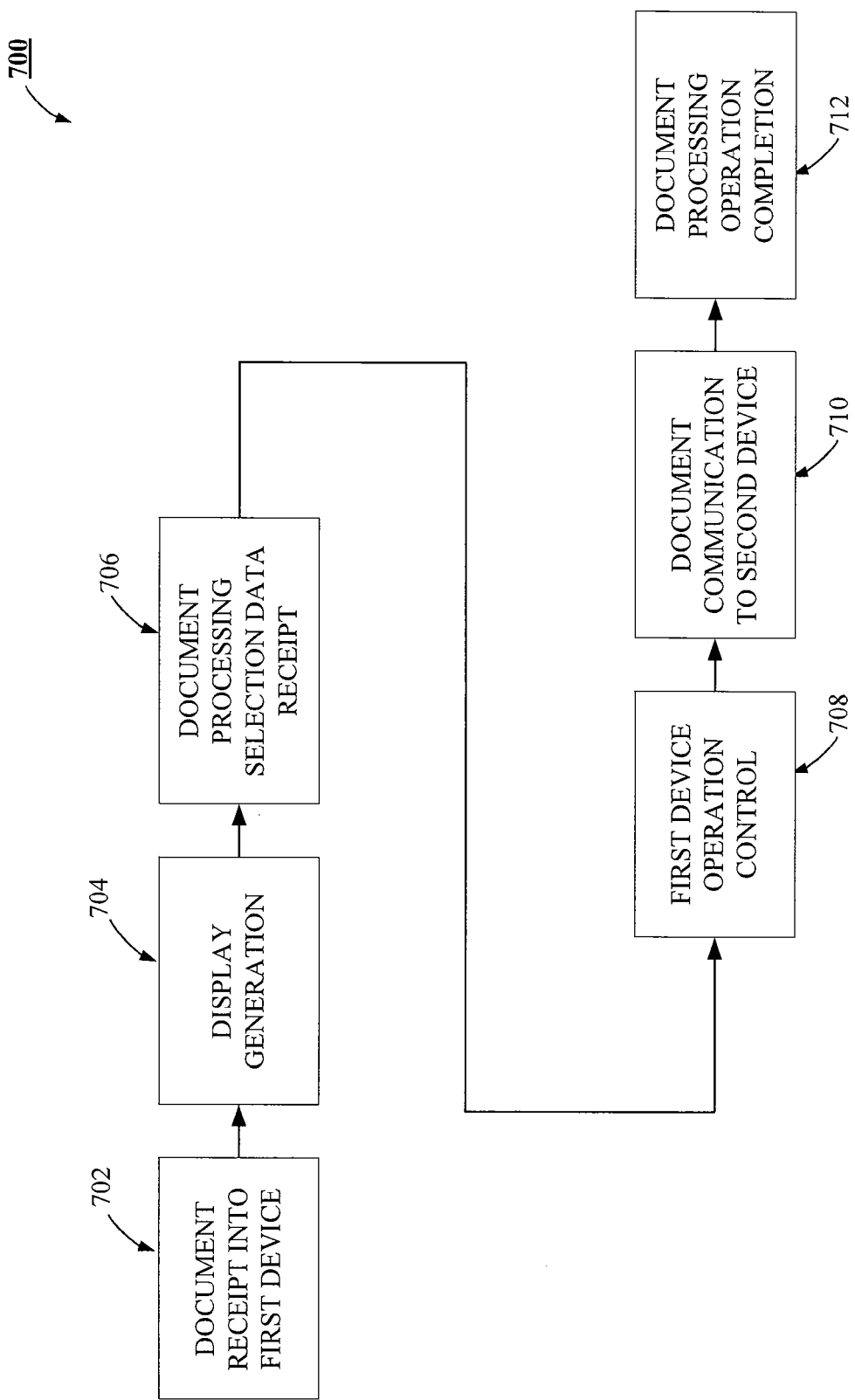
FIG. 7 is a functional diagram illustrating the system for coordinated document processing operations among devices having differing functionality according to one embodiment of the subject application.

Turning now to FIG. 7, illustrated is a functional diagram of a system 700 for coordinated document processing operations among devices having differing functionality in accordance with one embodiment of the subject application. As shown in FIG. 7, document receipt 702 occurs of a document into a first document processing device, which first device includes a first set of document processing functions. Display generation 704 is then performed on a user interface of the first device. Preferably, the display generation 704 includes indicia corresponding to one or more available document processing operations, where the document processing operation includes a function from the first set of functions and one or more secondary functions of a second document processing device. According to one embodiment of the subject application, the one or more secondary document processing functions are outside the first set of functions. It will be appreciated by those skilled in the art that the first and second document processing devices are in data communication with each other via an associated data network.

Document processing selection data receipt 706 then occurs via the user interface. In accordance with one embodiment of the subject application, the selection data corresponds to a user-selected document processing operation for the document. Preferably, the document processing operation includes one or more document processing functions from the first set of functions and one or more secondary functions of the second document processing device. First device operation control 708 is then undertaken of the first device in accordance with an associated controller, which includes a processor and associated data storage. According to one embodiment of the subject application, the controller is operable to control the first set of document processing functions such that the first document processing device performs the one or more document processing functions of the first function set on the document. Document communication 710 is then performed of the document to the second document processing device after completion of the one or more document processing functions of the first function set. Document processing operation completion 712 then occurs at the second document processing device via completion of the one or more secondary document processing functions based upon the received document processing selection data.

Figure 8:
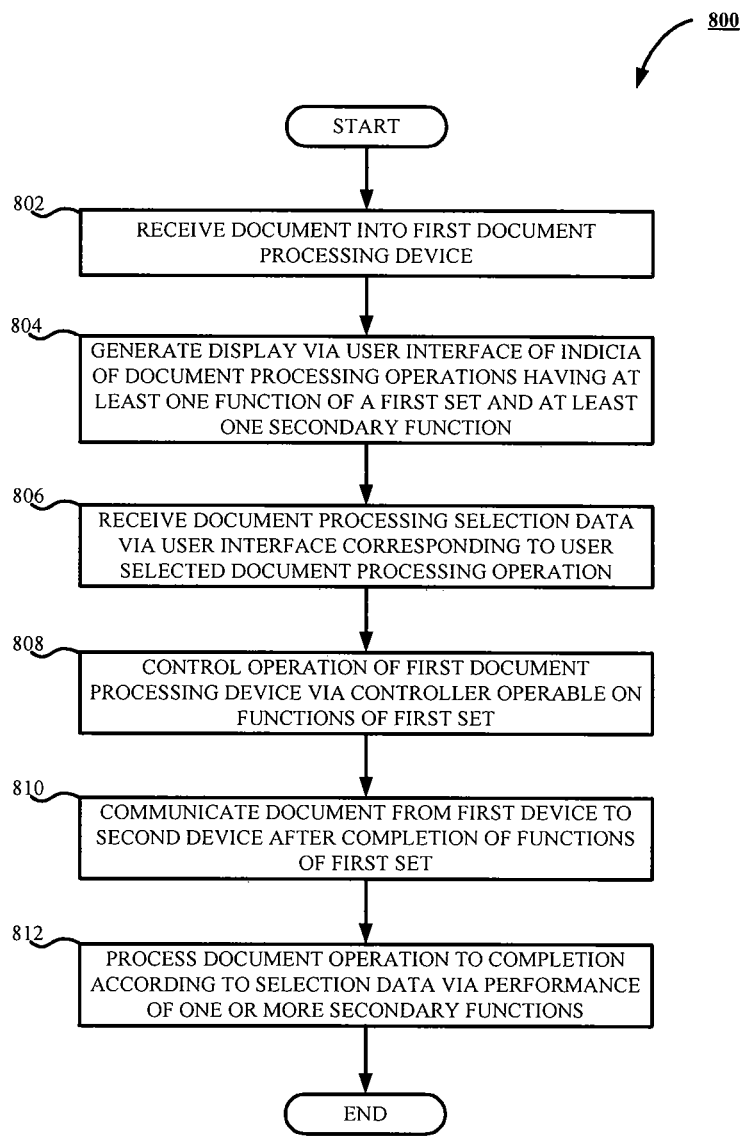
FIG. 8 is a flowchart illustrating a method for coordinated document processing operations among devices having differing functionality according to one embodiment of the subject application.

The skilled artisan will appreciate that the subject system 100 and components described above with respect to FIG. 1, FIG. 2, FIG. 3, FIG. 4, FIG. 5, FIG. 6, and FIG. 7 will be better understood in conjunction with the methodologies described hereinafter with respect to FIG. 8 and FIG. 9. Turning now to FIG. 8, there is shown a flowchart 800 illustrating a method for coordinated document processing operations among devices having differing functionality in accordance with one embodiment of the subject application. Beginning at step 802, a document is received into a first document processing device that has a first set of document processing functions.

At step 804, a display is generated on a user interface of the first document processing device. According to one embodiment of the subject application, the display includes indicia that correspond to at least one available document processing operation. In such an embodiment, the at least one available document processing operation includes at least one document processing function of the first set of such functions and at least one secondary function of a second document processing device, with any secondary function being outside the first set of functions. Preferably, the first document processing device and the second document processing device are in network data communication.

Document processing selection data is then received at step 806 via the user interface corresponding to a user selected document processing operation for the document. According to one embodiment of the subject application, the document processing operation includes the one or more document processing functions from the first set of functions and the one or more secondary functions. Operation of the first document processing device is then controlled at step 808 in accordance with an associated controller, which includes a processor and associated data storage. In accordance with one embodiment of the subject application, the controller is operable to control the operations of the first set of document processing functions such that the first document processing device performs the at least document processing function from the first set of functions on the document. The document is then communicated to the second document processing device at step 810 following completion of the one or more functions from the first set by the first document processing device. At step 812, the document is processed to complete the document processing operation in accordance with the document processing selection data via completion of the one or more secondary document processing functions on the document by the second document processing device.

Figure 9:
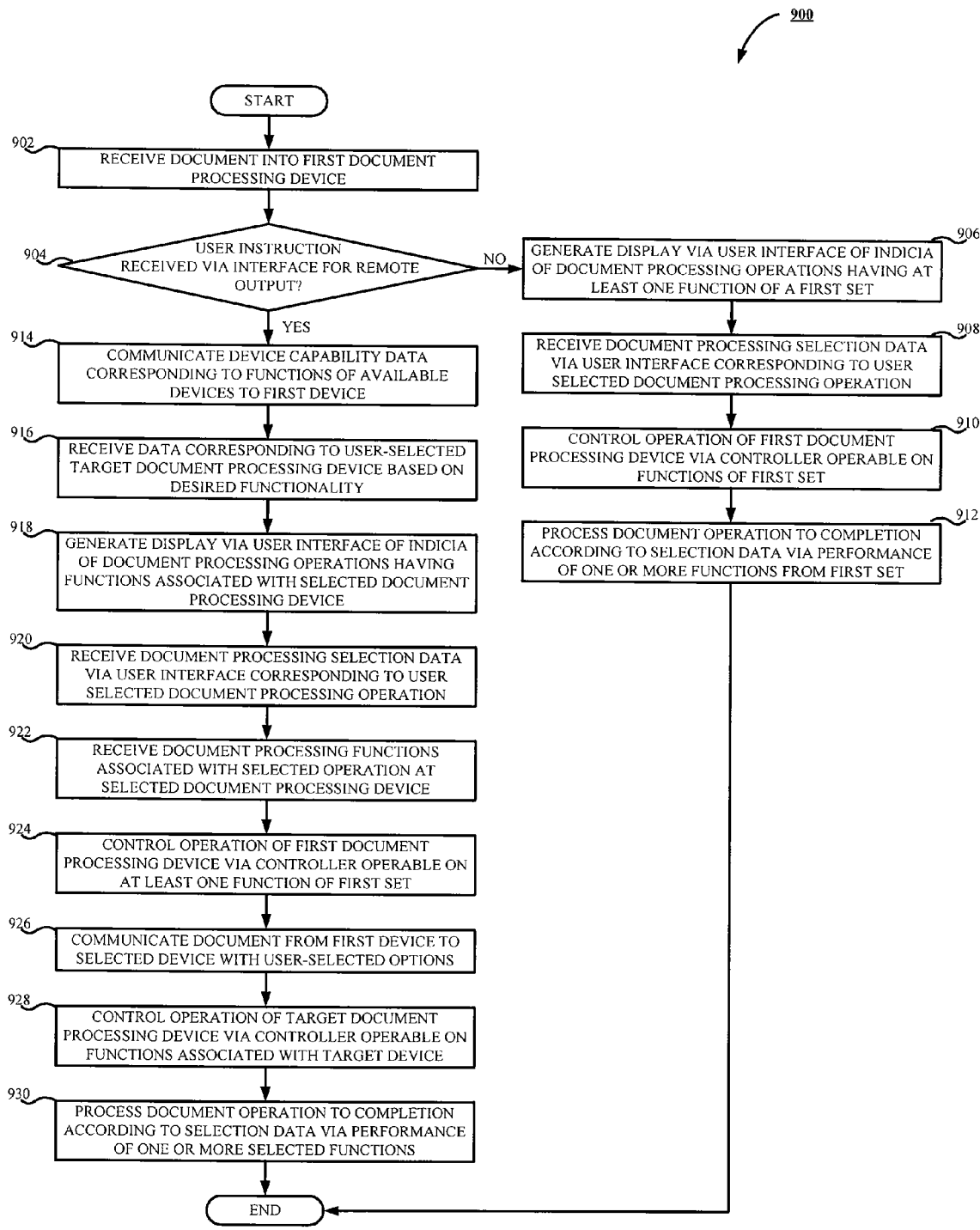
FIG. 9 is a flowchart illustrating a method for coordinated document processing operations among devices having differing functionality according to one embodiment of the subject application.

Referring now to FIG. 9, there is shown a flowchart 900 illustrating a method for coordinated document processing operations among devices having differing functionality in accordance with one embodiment of the subject application. The methodology of FIG. 9 begins at step 902, whereupon a document is received via operation of the first document processing device 104 so as to generate electronic document data thereof. According to one embodiment of the subject application, the operation is a scanning operation. The skilled artisan will appreciate that such a scanning operation is for example purposes only, and an associated user is capable of providing electronic document data via electronic mail attachment, via a portable storage device, via a facsimile transmission, via retrieval from network storage, or the like.

At step 904, a determination is made whether a user associated with the first document processing device 104 has selected a remote output operation, i.e. whether the user desires to make use of the functionality of one or more remote document processing devices 114, 124, and/or 134. When it is determined at step 904 that user instructions corresponding to a remote output operation have not been received from the associated user, operations proceed to step 906. At step 906, a display is generated via the user interface 106 associated with the first document processing device 104 of document processing operations having at least one function of a first set, the first set of functions corresponding to the capabilities of the first document processing device 104. Document processing selection data is then received from the associated user via the user interface 106 at step 908 corresponding to a selected document processing operation. Operations of the first document processing device 104 are then controlled via the controller 108 operable on the functions of the first set at step 910. The selected document processing operation is then processed to completion by performing the one or more functions of the first set of functions under the direction of the controller 108 in accordance with the selected document processing operation at the first document processing device 104 at step 912.

When it is determined at step 904 that user instructions corresponding to a remote output operation have been received from the associated user, operations proceed to step 914. At step 914, accessible document processing devices 114, 124, and 134 communicate respective device capability data corresponding to available functions to the first document processing device 104. It will be appreciated by those skilled in the art that such functions include, for example and without limitation, color output, finishing options, facsimile transmissions, storage options, network options, and the like.

Data is then received at step 916 corresponding to a user-selected target document processing device 114, 124, or 134 based upon a desired functionality. That is, the user browses the cluster of devices 104, 114, 124, and 134 so as to select a target device that includes the functionalities or options desired by the user. Upon receipt of a selected target device 114, 124, or 134, operations proceed to step 918, whereupon a display is generated via the user interface 106 of the first device 104 of indicia of document processing operations and functions associated with the selected document processing device 114, 124, or 134. That is, the user interface 106 displays a graphical user interface associated with the selected document processing device 114, 124, or 134, e.g. the icons, functions, options, configurations, and the like, that would normally be displayed to the user if the user were physically present at the user interface 116, 126, or 136 associated with the selected document processing device 114, 124, or 134, respectively.

Via the user interface 106 of the first document processing device 104, document processing selection data is received from the associated user corresponding to a selected document processing operation at step 920. At step 922, document processing functions (options) associated with the selected document processing operation at the target document processing device 114, 124, or 134 are received from the associated user via the user interface 106. It will be appreciated by those skilled in the art that these functions, e.g. output options, correspond to those capable of being performed by the selected document processing device 114, 124, or 134. In accordance with one embodiment of the subject application, the functions are displayed on the user interface 106 of the first device 104 in the same manner, i.e. visual depiction, as the user interface 116, 126, or 136 of the selected target device 114, 124, or 134, respectively. Operations of the first document processing device 104 are then controlled via the controller 108 operable on at least one function from the first set associated with the selected document processing operation at step 924.

The controller 108 or other suitable component associated with the first document processing device 104 then communicates the document and associated selected functions to the selected document processing device 114, 124, or 134 at step 926. At step 928, the controller 118, 128, or 138 associated with the selected target document processing device 114, 124, or 134 then controls operations of the target document processing device 114, 124, or 134 based upon the functions associated with the selected document processing operation corresponding to the selected device 114, 124, and 134. The selected document processing operation is then processed to completion according to the selected document processing operation and associated functions (options) at step 930 by the target document processing device 114, 124, or 134. For example, the target document processing device 114, 124, or 134 prints the scanned document via a printer associated with the target device 114, 124, or 134 in accordance with the selected functions. In another example, the target device 114, 124, or 134 transmits the scanned document via a facsimile device associated with the target device 114, 124, or 134.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for coordinated document processing operations among devices having differing functionality comprising:
   a first document processing device having a scanning function;
   a controller, including a processor and associated data storage, operable to control operation of the first document processing device;
   a user interface to the controller, the user interface including a display;
   an input operable to receive a document into the first document processing device;
   a second document processing device having a second document processing function unable to be performed by the first document processing device, wherein the first document processing device is in data communication with the second document processing device via an associated data network;
   a display generator associated with the controller, the display generator operable to generate document processing selection data on the display, the document processing selection data including a document processing operation for the document, the document processing operation including the scanning function and the second document processing function;
   wherein the user interface is operable to receive user selection input data corresponding to a user-selected document processing operation, the user-selected document processing operation corresponding to the document processing operation; and
   wherein the controller is operable to perform the scanning function on the document and to communicate the document to the second document processing device thereafter for completion of the second document processing function.

2. The system of claim 1 further comprising an output on the second document processing device operable to communicate device capability data corresponding to the second document processing function to the first document processing device so as to generate indicia on the display corresponding to the second document processing function.

3. The system of claim 1 wherein the second document processing function includes a printing function so as to print the document using the second document processing device.

4. The system of claim 1 wherein the second document processing function includes a facsimile transmission of the document using the second document processing device.

5. The system of claim 1 wherein the user interface includes an input operable to receive a user-instruction so as to generate a display corresponding to the second document processing function.

6. The system of claim 5 wherein the display generator is further operable to generate a display on the user interface corresponding to document processing functions of a third document processing device.

7. A method for coordinated document processing operations among devices having differing functionality comprising:
   generating a display on a user interface of a first document processing device, the display including indicia corresponding to a scanning function capable of being performed by the first document processing device and a second document processing function capable of being performed by a second document processing device and unable to be performed by the first document processing device, wherein the first and second document processing devices are in network data communication;
   receiving document processing selection data via the user interface corresponding to a user-selected document processing operation for a document, the user-selected document processing operation including the scanning function and the second document processing function; and
   controlling operation of the first document processing device to perform a scanning function using the first document processing device and to communicate
   the document to the second document processing device after completion of the scanning function for completion of the second document processing function such that the document is processed to complete the user-selected document processing operation.

8. The method of claim 7 further comprising communicating device capability data corresponding to the second document processing function from the second document processing device to the first document processing device so as to generate the indicia on the display.

9. The system of claim 7 wherein the second document processing function includes printing the document.

10. The method of claim 7 wherein the second document processing function includes transmitting the document via a facsimile device associated with the second document processing device.

11. The system of claim 7 further comprising receiving a user-instruction via the user interface so as to generate a display corresponding to the second document processing function on the user interface.

12. The method of claim 11 further comprising generating a display on the user interface corresponding to a document processing operation including a third document processing operation unable to be performed by the first document processing device.

13. A system for coordinated document processing operations among devices having differing functionality comprising:
   means for generating a display on a user interface of a first document processing device, the display including indicia corresponding to a scanning function capable of being performed by the first document processing device and a second document processing function capable of being performed by a second document processing device and unable to be performed by the first document processing device, wherein the first and second document processing devices are in network data communication;
   means for receiving document processing selection data via the user interface corresponding to a user-selected document processing operation for a document, the user-selected document processing operation including the scanning function and the second document processing function; and
   means for controlling operation of the first document processing device to perform the a scanning function using the first document processing device and to communicate
   the document to the second document processing device after completion of the scanning function for completion of the second document processing function such that the document is processed to complete the user-selected document processing operation.

14. The system of claim 13 further comprising means for communicating device capability data corresponding to the second document processing function from the second document processing device to the first document processing device so as to generate the indicia on the display.

15. The system of claim 13 wherein the second document processing function includes printing the document.

16. The system of claim 13 wherein the second document processing function includes transmitting the document via a facsimile device associated with the second document processing device.

17. The system of claim 13 further comprising means adapted for generating a display on the user interface corresponding to a document processing operation including a third document processing operation unable to be performed by the first document processing device.

* * * * *